US012688566B2

(12) United States Patent
Lee et al.

(10) Patent No.: US 12,688,566 B2
(45) Date of Patent: Jul. 21, 2026

(54) IMAGE ENHANCEMENT SYSTEM TO RECEIVE IMAGE DATA FROM IMAGER AND DISPLAY DATA FOR EXECUTING IMAGE ENHANCEMENT AND EDGE ENHANCEMENT MODIFICATION OF IMAGE DATA

(71) Applicant: GM Global Technology Operations LLC, Detroit, MI (US)

(72) Inventors: Toure Lee, Pontiac, MI (US); Sai Vishnu Aluru, Commerce Township, MI (US); Shihchye Allen Lin, Orlando, FL (US)

(73) Assignee: GM Global Technology Operations LLC, Detroit, MI (US)

( * ) Notice: Subject to any disclaimer, the term of this patent is extended or adjusted under 35 U.S.C. 154(b) by 261 days.

(21) Appl. No.: 18/415,177

(22) Filed: Jan. 17, 2024

(65) Prior Publication Data

US 2025/0232419 A1    Jul. 17, 2025

(51) Int. Cl.
*G06T 5/92*      (2024.01)
*G06V 10/10*     (2022.01)

(52) U.S. Cl.
CPC ................ *G06T 5/92* (2024.01); *G06V 10/10* (2022.01)

(58) Field of Classification Search
None
See application file for complete search history.

(56) References Cited

U.S. PATENT DOCUMENTS

| | | | |
|---|---|---|---|
| 2009/0015683 A1* | 1/2009 | Ando | B60R 1/24 |
| | | | 348/E5.073 |
| 2014/0146127 A1 | 5/2014 | He et al. | |
| 2017/0277961 A1* | 9/2017 | Kuehnle | H04N 23/90 |
| 2020/0167114 A1* | 5/2020 | Hayashida | G06F 3/14 |
| 2020/0167996 A1* | 5/2020 | Watanabe | B60R 1/28 |
| 2021/0179173 A1* | 6/2021 | Yamanaka | B62D 15/028 |
| 2021/0233290 A1* | 7/2021 | Shimazu | B62D 15/0295 |
| 2023/0081302 A1 | 3/2023 | Kwon et al. | |
| 2025/0348982 A1* | 11/2025 | Kamiunten | G06T 7/74 |

* cited by examiner

*Primary Examiner* — Haris Sabah
(74) *Attorney, Agent, or Firm* — Honigman LLP; Matthew H. Szalach

(57) ABSTRACT

An image enhancement system for a vehicle includes an imager configured to capture image data and a display operably coupled to the imager. The display includes display data. The image enhancement system also includes an electronic control unit (ECU) communicatively coupled to the imager and the display. The ECU includes data processing hardware configured to execute an image enhancement application. The image enhancement application is configured to receive the image data from the imager and display data from the display. The image enhancement application is configured to execute an image enhancement and edge enhancement modification of the image data based on the display data.

20 Claims, 5 Drawing Sheets

IMAGE ENHANCEMENT SYSTEM TO RECEIVE IMAGE DATA FROM IMAGER AND DISPLAY DATA FOR EXECUTING IMAGE ENHANCEMENT AND EDGE ENHANCEMENT MODIFICATION OF IMAGE DATA

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to an image enhancement system.

Modern vehicles may include monitoring systems that are equipped with cameras to detect various activities within the main cabin of the vehicle. The cameras are typically positioned within sight of the occupants of the vehicle to maximize image capture and minimize pixel disruption from surrounding displays. In some instances, the cameras can be disabled or otherwise obstructed by the occupants. During operation, the monitoring systems typically utilize machine learning techniques. However, machine learning requires significant training and a higher computing power, which reduces the efficiency of the system. Thus, there is a need for an improved imaging system that can efficiently capture and analyze the cabin activities with minimal disruption from the occupants.

SUMMARY

In some aspects, an image enhancement system for a vehicle includes an imager configured to capture image data and a display operably coupled to the imager. The display includes display data that includes an operational state of the display. The image enhancement system also includes an electronic control unit (ECU) communicatively coupled to the imager and the display. The ECU includes data processing hardware configured to execute an image enhancement application. The image enhancement application is configured to receive the image data from the imager and display data from the display. The image enhancement application is configured to execute an image enhancement and edge enhancement modification of the image data based on the display data. The image enhancement application is also configured to render an image in response to the image enhancement and the edge enhancement modification.

In some examples, the image enhancement application may include an image signal process configured to receive the display data from the display. The image signal process may be configured to render the image data based on the display data received from the display. In some instances, the image enhancement may include at least one of bit-plane splicing, tone mapping restoration, contrast restoration, luma restoration, and chroma adjustment. The display data may include at least one of a backlight ratio, a contrast ratio, and a display density. The data processing hardware may be configured to execute the image enhancement based on at least one of the operational state, the backlight ratio, the contrast ratio, and the display density. Optionally, the image enhancement application may be configured to compare a pixel density from the image data and the display density of the display data. In some configurations, the edge enhancement modification may include image composition, and the data processing hardware may be configured to execute the image composition in response to the image enhancement.

In other aspects, an image enhancement system includes a display including display data and an imager operably coupled to and disposed behind the display. The imager is configured to capture image data. The image enhancement system also includes an electronic control unit (ECU) communicatively coupled to the imager and the display. The ECU includes data processing hardware configured to execute an image enhancement application. The image enhancement application is configured to receive the image data from the imager and the display data from the display and to execute an image enhancement and edge enhancement modification of the image data based on the display data.

In some examples, the image enhancement application includes an image signal process configured to receive the display data from the display. The image signal process may be configured to render the image data based on the display data received from the display. In some instances, the image enhancement may include at least one of bit-plane splicing, tone mapping restoration, contrast restoration, luma restoration, and chroma adjustment. The display data may include at least one of an operational state, a backlight ratio, a contrast ratio, and a display density. The data processing hardware may be configured to execute the image enhancement based on at least one of the operational state, the backlight ratio, the contrast ratio, and the display density. Optionally, the image enhancement application may be configured to compare a pixel density from the image data and the display density of the display data. In some configurations, the edge enhancement modification may include image composition, the data processing hardware configured to execute the image composition in response to the image enhancement.

In further aspects, a computer-implemented method when executed by data processing hardware causes the data processing hardware to perform operations. The operations include acquiring display data from a display including an operational state, monitoring, via a lookup table value, a display data of the display, acquiring image data from an imager, and rendering, via an image enhancement application, the acquired image data in response to the operational state of the display. The operations also include executing, via the image enhancement application, image enhancement of the rendered image data based on the display data, executing, via the image enhancement application, an edge enhancement modification of the image data, and composing the enhanced image data.

In some examples, executing the image enhancement may include one or more of performing bit-plane splicing of the image data, performing tone mapping restoration of the image data, performing contrast restoration of the image data, performing luma restoration of the image data, and performing chroma adjustment of the image data. Performing bit-plane splicing may include removing image artifacts of the image data. Optionally, the operations may include constructing the imager behind the display. In some instances, acquiring the display data may include acquiring a backlight ratio, a contrast ratio, and a display density. In some instances, executing the image enhancement and executing the edge enhancement modification may include referencing the display data.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
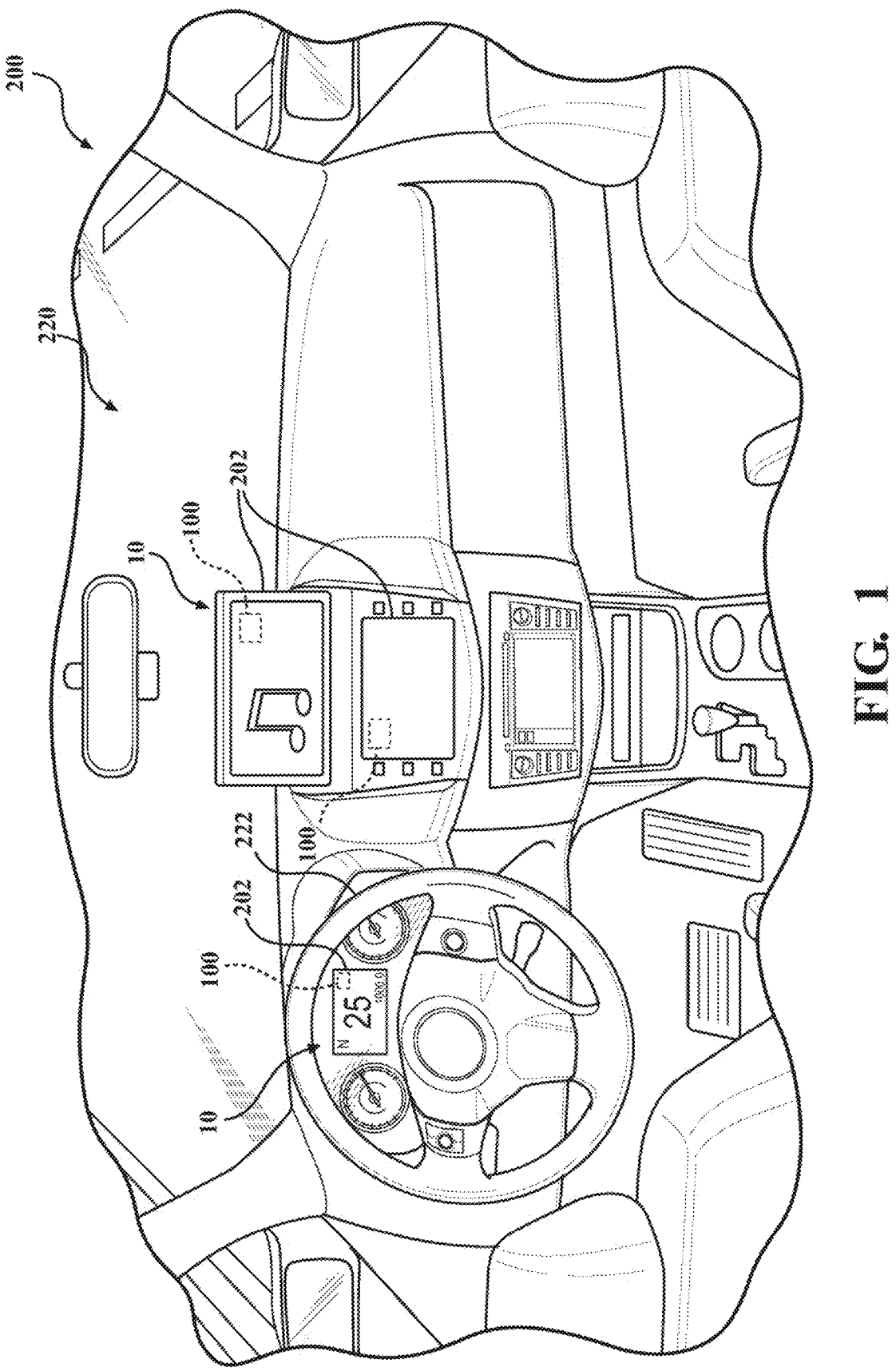
FIG. 1 is a partial perspective view of an interior cabin of a vehicle equipped with an image enhancement system according to the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Figure 2:
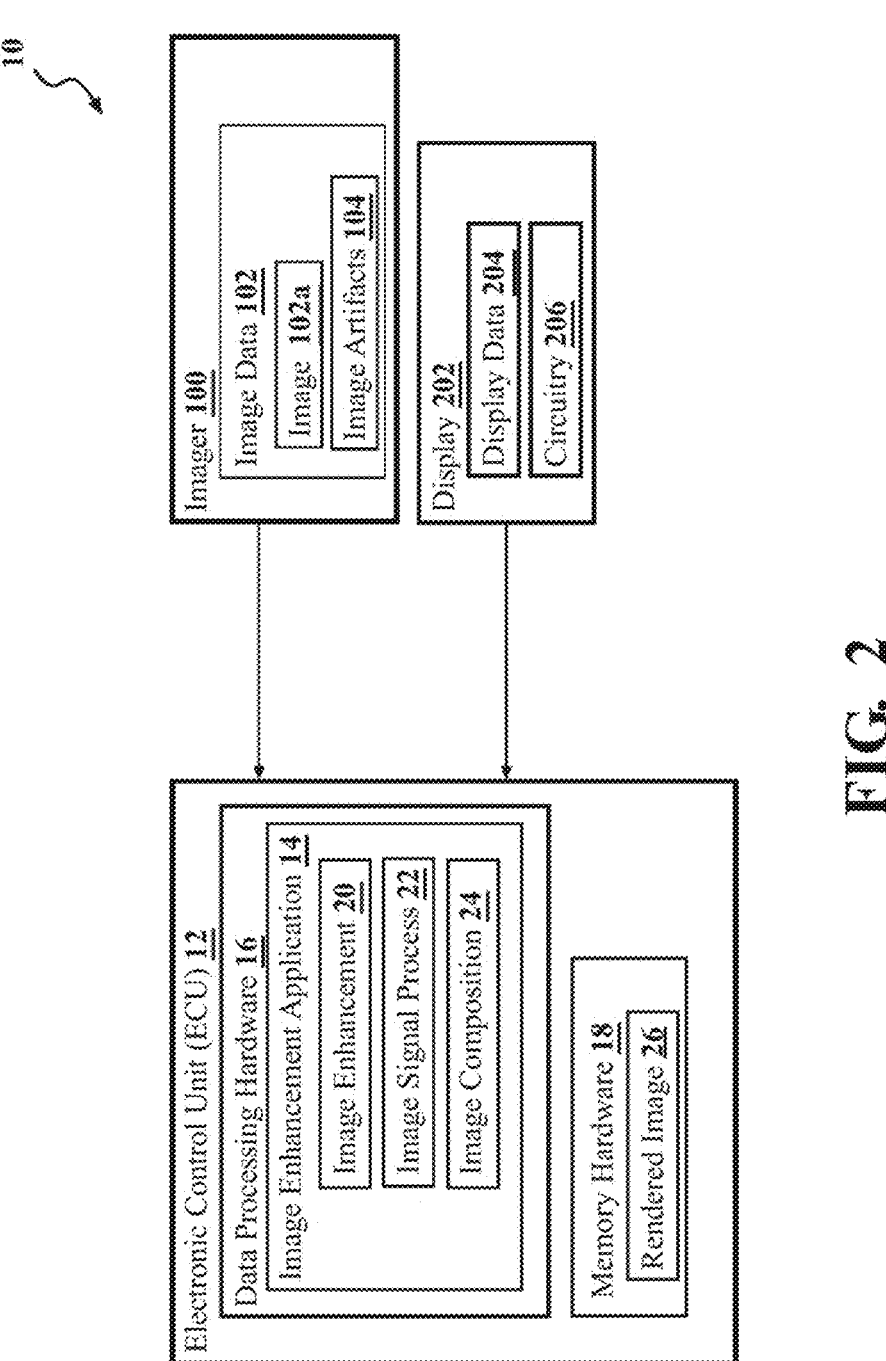
FIG. 2 is a block diagram for an image enhancement system according to the present disclosure.
Figure 3:
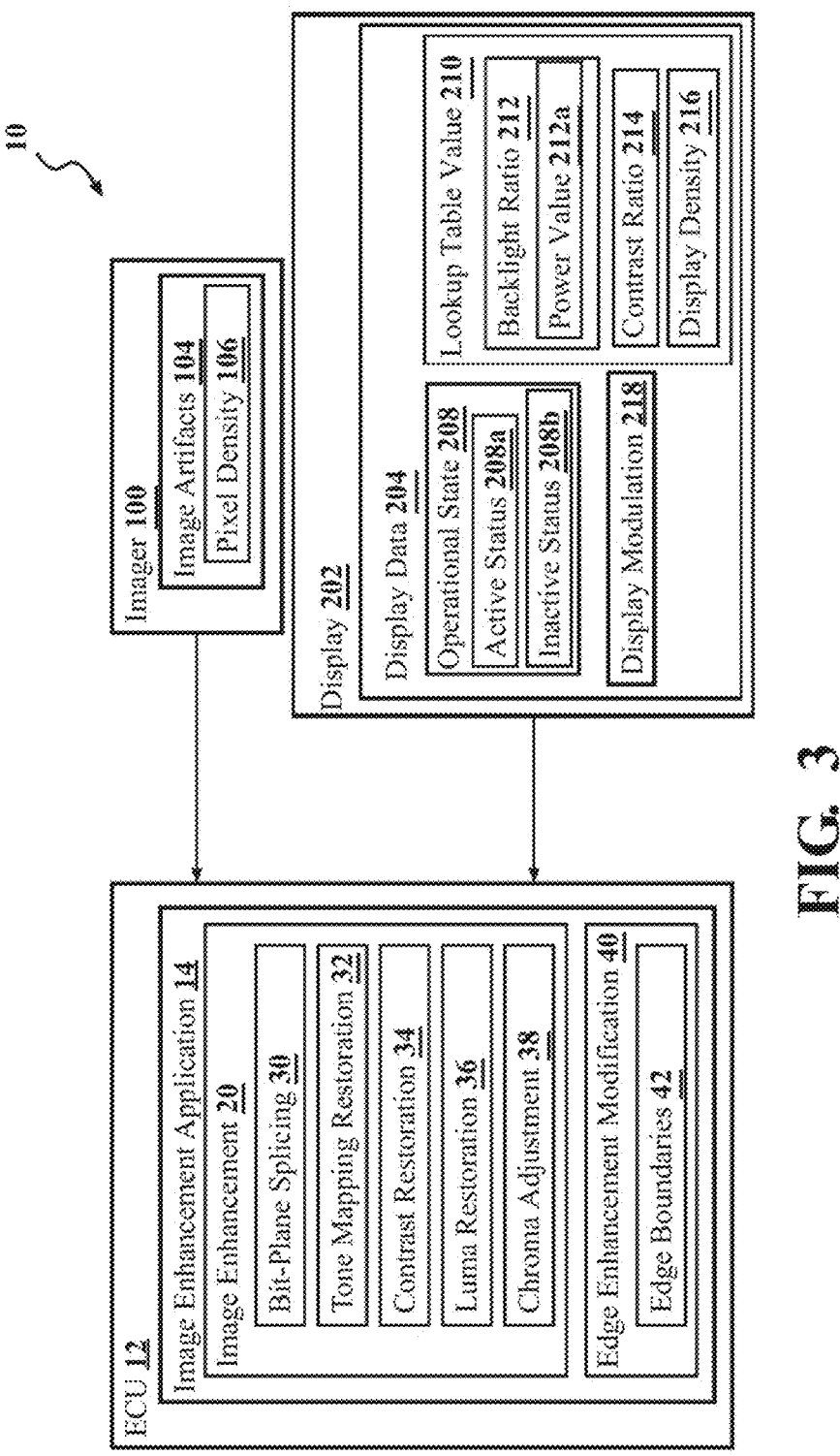
FIG. 3 is another block diagram for the image enhancement system of FIG. 2.

Referring to FIGS. 1-3, an image enhancement system 10 includes an electronic control unit (ECU) 12 and an imager 100. The image enhancement system 10 is configured for a vehicle 200, such that the ECU 12 may be a central computing system of the vehicle 200. The ECU 12 is configured with an image enhancement application 14 configured to process image data 102 received from the imager 100. The image enhancement system 10 further includes a display 202 of the vehicle 200 that provides the ECU 12 with display data 204, described below. In executing the image enhancement application 14, the ECU 12 receives the display data 204 of the display 202 in combination with the acquired image data 102, described in more detail below.

The imager 100 is configured to monitor the occupants of the vehicle 200 and may also provide images 102a on the display 202. The images 102a are provided as part of the image data 102 to the ECU 12 for enhancement by the image enhancement application 14. For example, the images 102a, independent of enhancement, may have a low visibility, such that the display 202 may project flickering and/or dull images 102a. Thus, the image enhancement application 14 advantageously assists in rendering a clear image to be displayed by the display 202. The imager 100 is operably coupled to and disposed behind the display 202 in various locations within the vehicle 200. The imager 100 may thus include a plurality of imagers 100 commensurate with the number of displays 202 equipped within the vehicle 200. In some examples, the imager 100 may be disposed behind circuitry 206 of the display 202, which may impact the quality of the raw image data 102. Thus, the display data 204 may directly impact the image data 102. The image enhancement application 14 is configured to advantageously enhance and render the image data 102, as described in more detail below.

The ECU 12 is communicatively coupled to both the imager 100 and the display 202 and includes data processing hardware 16 configured to execute the image enhancement application 14. The ECU 12 also includes memory hardware 18, described below, which is communicatively coupled with the data processing hardware 16. The image enhancement application 14 is configured to receive the image data 102 from the imager 100 and receive the display data 204 from the display 202. As part of the rendering process of the image data 102, the image enhancement application 14 includes image enhancement 20, an image signal process 22, and image composition 24, each described separately herein.

Each of the image enhancement 20, the image signal process 22, and the image composition 24 are executed by the data processing hardware 16 in response to receiving the image data 102. Thus, the image enhancement application 14 executes the image enhancement 20 of the image data 102 based on the display data 204 of the display 202, described in further detail below. For example, the image enhancement application 14 acquires the image data 102 and executes the image signal process 22. The image signal process 22 uses the display data 204 as an input in evaluating the image data 102.

With further reference to FIGS. 1-3, the imager 100 captures the image data 102, which may include an image 102a to be displayed on the display 202. As described herein, the image 102a may be rendered by the image enhancement application 14. The image data 102 also includes image artifacts 104 that may be a result of the positioning of the imager 100 behind the display 202, and which are corrected using the image enhancement 20 to generate a rendered image 26. For example, the image enhancement 20 removes the image artifacts by utilizing the display data 204 as an input to the image enhancement application 14. Further, the image enhancement application 14 may utilize pixel density 106 of the image artifacts 104 during the process of image enhancement 20, described below.

The display data 204 may be analyzed by the image signal process 22 of the image enhancement application 14. For example, the display data 204 includes an operational state 208 of the display 202, which includes an active state 208a and an inactive state 208b. When the display 202 is in the inactive state 208b, the image signal process 22 is activated by the image enhancement application 14 without necessarily executing the additional enhancements of the image enhancement application 14. Thus, the image enhancement application 14 can directly compose and render the image data 102 with the image signal process 22. As described herein, the image enhancement application 14 executes the additional enhancements when rendering the image data 102 in response to the active state 208a of the display 202. Thus, the display data 204 serves as an input to the image enhancement application 14 in deciding which image enhancement 20, if any, to execute.

Referring still to FIGS. 1-3, the display data 204 includes additional data related to the display 202 that may collectively define a lookup table value 210 of the display 202. The image enhancement system 10 utilizes the lookup table value 210 to monitor the display data 204 of the display 202 to determine which image enhancement 20 to execute. The lookup table value 210 includes, but is not limited to, a backlight ratio 212, a contrast ratio 214, and a display density 216. The data processing hardware 16 is configured to execute the image enhancement 20 based on at least one of the operational state 208, the backlight ratio 212, the contrast ratio 214, and the display density 216.

The backlight ratio 212 may include a power value 212a. The contrast ratio 214 provides the ECU 12 with contrast data related to the image data 102 relative to the display 202. For example, the display 202 may project an image 102a associated with the image data 102, and the contrast ratio 214 may reflect the contrast of the displayed image 102a. Further, the ECU 12 may receive the display density 216, which generally relates to the pixel density 106 of the image artifacts 104. For example, the display density 216 is compared with the pixel density 106 by the image enhancement application 14.

Referring further to FIGS. 1-3, the image enhancement application 14, in response to receiving the image data 102, acquires the display data 204 including each of the backlight ratio 212, the contrast ratio 214, and the display density 216 to execute the image enhancement 20. For example, the image enhancement application 14 acquires the display data 204 and initially renders the image data 102 based on the operational state 208, as mentioned above. In general, the image enhancement application 14 is configured to compare the pixel density 106 of the image data 102 with the display density 216 of the display data 204. The image enhancement 20 executes, based on the display data 204, processes to enhance the image data 102 and, ultimately, render the rendered image 26. The rendered image 26 may be stored on the memory hardware 18. In some examples, the rendered image 26 may be displayed on the display 202. The image enhancement 20 executes at least one of bit-plane splicing 30, tone mapping restoration 32, contrast restoration 34, luma restoration 36, and chroma adjustment 38 as part of the image enhancement 20.

For example, the image enhancement application 14 executes bit-plane splicing to detect display modulation 218 from the display 202. Display modulation 218 occurs when there is flickering and/or banding present on the display 202, as a result of the unrendered image data 102. The display modulation 218 may be detected by the ECU 12 based on the lookup table values 210 received from the display 202. The image enhancement application 14 executes the bit-plane splicing 30 in response to the detected display modulation 218. The bit-plane splicing 30 is executed by the ECU 12 by dividing the pixel density 106 of the image data 102. For example, the image data 102 may be converted into binary form and subsequently divided into respective bit planes by the image enhancement application 14. Thus, the bit-plane splicing 30 modifies the arrangement of the pixels of the image data 102 to minimize and/or eliminate flickering or banding of the image data 102. For example, the bit-plane splicing 30 performed by the image enhancement application 14 removes the image artifacts 104 of the image data 102 that may correspond to the flickering and/or banding.

In parallel with the bit-plane splicing 30, the image enhancement application 14 executes the contrast restoration 34 and tone-mapping restoration 32. The tone-mapping restoration 32 removes the flickering and/or banding detected by the image enhancement application 14. Further, the tone mapping restoration 32 may reduce tonal values of the image data 102. In general, the tone mapping restoration 32 may be utilized to expand a luminance range of the image data 102 by mapping colors of the image data relative to the display density 216 of the display 202 to approximate the appearance of the display 202 with the image data 102.

The contrast restoration 34 utilizes the contrast ratio 214 received from the display 202 to adjust the contrast of the image data 102. For example, the contrast of the image data 102 may be inconsistent with the contrast ratio 214 of the display 202. The inconsistency between the contrast of the image data 102 and the display 202 is adjusted by the image enhancement application 14 through the execution of the contrast restoration 34. The contrast restoration 34 is executed at a pixel level of the image data 102. For example, the image enhancement application 14 may clarify the image artifacts 104 by adjusting the pixel density 106. The adjusted pixel density 106 may alter the contrast of the image data 102 relative to the display 202 to, ultimately, enhance or otherwise improve a quality of the rendered image 26.

With further reference to FIGS. 1-3, the image enhancement application 14 may execute the luma restoration 36 in parallel with executing the contrast restoration 34. The luma restoration 36 is configured to restore brightness to the image data 102. As mentioned above, the imager 100 is disposed behind the display 202. It is contemplated that the display 202 may include multiple displays 202 positioned throughout an interior cabin 220 of the vehicle 200. Similarly, multiple imagers 100 may be positioned behind the multiple displays 202, such that each display 202 may have a respective imager 100 disposed behind the respective display 202. In some instances, the display 202 may be exposed to a high degree of both interior and exterior lighting. In other instances, the display 202 and the imager 100 may be positioned in an area of the interior cabin 220 that gets exposed to minimal amounts of lighting, such that the overall brightness of the image data 102 may be skewed.

For example, the imager 100 and the display 202 may be positioned behind a steering wheel 222 of the vehicle 200. Thus, the backlight ratio 212 of the display 202 may be increased and may affect the brightness of the image data 102. The image enhancement application 14 is configured to correct for the discrepant brightness of the image data 102 by executing the luma restoration 36 of the image enhancement 20. In some examples, the luma restoration 36 may be executed to correct for overexposure of the image data 102 as a result of an increased degree of exterior light received by the imager 100 and the display 202. Further, the image enhancement application 14 is configured to simultaneously adjust the image data 102 received from multiple imagers 100, such that the luma restoration 36 executed for one set of image data 102 may be different from the luma restoration 36 executed for a separate set of the image data 102.

Referring still to FIGS. 1-3, the image enhancement application 14 may execute the chroma adjustment 38 upon completion of each of the bit-plane splicing 30, the tone mapping restoration 32, the contrast restoration 34, and the luma restoration 36. The chroma adjustment 38 is configured to adjust the color intensity, or saturation, of the image data 102. As noted above, the saturation of the image data 102 may be altered as a result of the positioning of the imager 100 relative to the display 202. For example, positioning the imager 100 behind the circuitry 206 of the display 202 may alter the saturation of the image data 102, as the imager 100 may capture reflection from the circuitry 206 of the display 202.

Once the chroma adjustment 38 is complete, the image enhancement application 14 executes an edge enhancement modification 40 of the image data 102. The edge enhancement modification 40 adjusts the sharpness of the image data 102. The image enhancement application 14 executes the edge enhancement modification 40 as a last step prior to the image composition 24. Thus, the edge enhancement modification 40 is performed by the image enhancement application 14 after completion of each of the image enhancements 20. The edge enhancement modification 40 identifies edge boundaries 42 of the image data 102 and increases the contrast of the image data 102 immediately around the edge boundaries 42 to sharpen the image data 102.

With further reference to FIGS. 1-3, the image enhancement application 14 executes the image composition 24 in response to completion of the edge enhancement modification 40. In some examples, the edge enhancement modification 40 may include the image composition 24. The data processing hardware 16 may be configured to execute the image composition 24 in response to the image enhancement 20. The image composition 24 compiles the pixels of the image data 102 that have undergone both the image enhancement 20 and the edge enhancement modification 40. Thus, the image composition 24 results in the rendered image 26 that is ultimately stored in the memory hardware 18 and/or displayed on the display 202.

Figure 4:
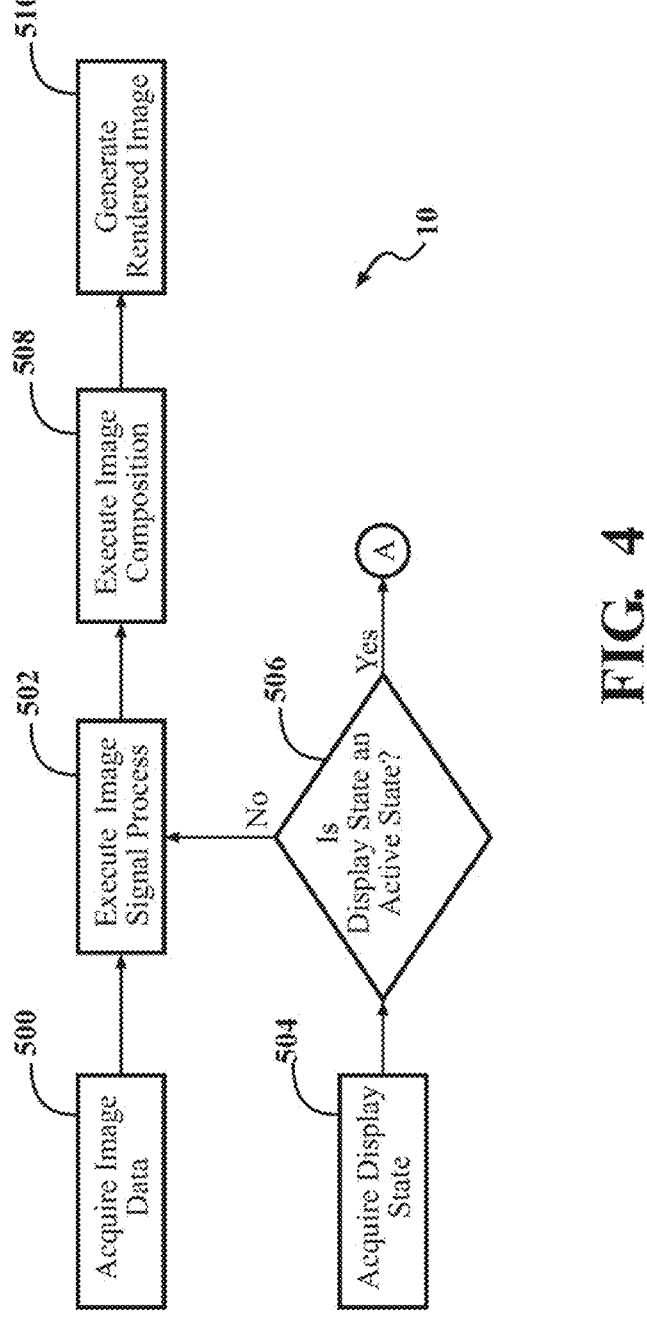
FIG. 4 is an example flow diagram for an image enhancement system according to the present disclosure.
Figure 5:
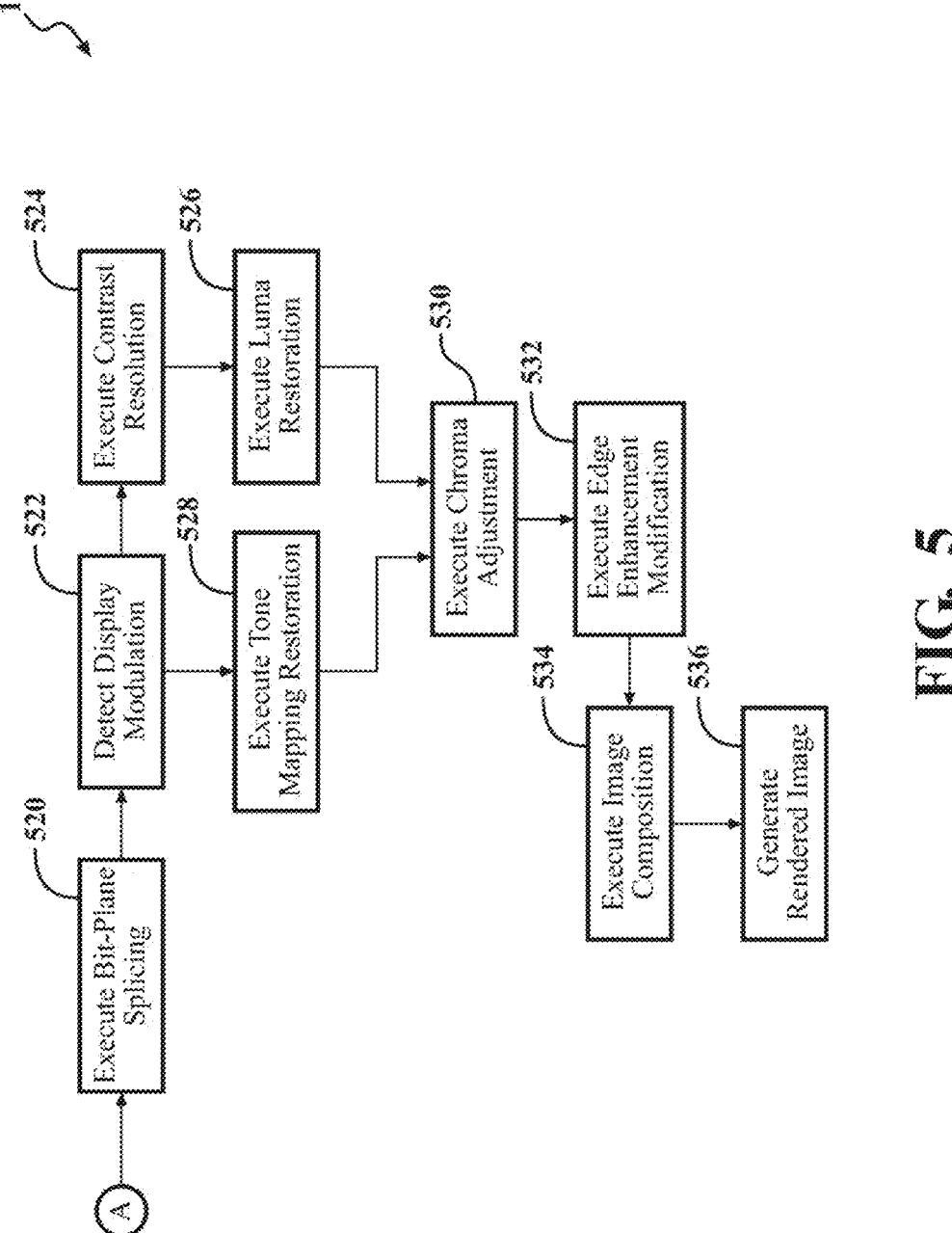
FIG. 5 is another flow diagram for the image enhancement system of FIG. 4.

Referring now to FIGS. 4 and 5, example flow diagrams for the image enhancement system 10 are illustrated. At an initial step 500, the image data 102 is acquired by the ECU 12. The ECU 12 executes, at 502, the image signal process 22. The ECU 12 also acquires, at 504, the display data 204 from the display 202 and determines, at 506, whether the display data 204 is an active state 208a. If not, then the ECU 12 proceeds with executing the image signal process 22, at 502, and executing, at 508, the image composition 24. The image enhancement application 14 then generates, at 510, the rendered image 26.

If the display data 204 is in the active state 208a, then the image enhancement application 14 executes, at 520, the bit-plane splicing 30 and, at 522, detects the display modulation 218. The image enhancement application 14 executes, at 524, the contrast restoration 34 and, in parallel, executes, at 526, the luma restoration 36. The image enhancement application 14 also executes in parallel, at 528, the tone mapping restoration 32. Next, the image enhancement application 14 executes, at 530, the chroma adjustment 38. The edge enhancement modification 40 is subsequently executed, at 532. Based on the edge enhancement modification 40, the image enhancement application 14 executes, at 534, the image composition 24 and generates, at 536, the rendered image 26.

Referring again to FIGS. 1-5, the image enhancement system 10 advantageously renders the image data 102 with the imager 100 disposed behind the display 202. The positioning of the imager 100 behind the display 202 minimizes the overall packaging complexity while keeping the imager 100 relatively invisible to the driver. Further, the execution of the image enhancement application 14 by the ECU 12 minimizes the overall computing power used to render the image data 102. Thus, the image enhancement system 10 has improved efficiency as a result of the reduced computing power required for the image enhancement application 14.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. An image enhancement system for a vehicle, the image enhancement system comprising:

an imager configured to capture image data;

a display operably coupled to the imager and including display data, the display data including an operational state of the display; and an electronic control unit (ECU) communicatively coupled to the imager and the display and including data processing hardware configured to execute an image enhancement application, the image enhancement application configured to receive the image data from the imager and the display data from the display and being configured to execute an image enhancement and edge enhancement modification of the image data based on the display data including executing bit-plane splicing configured to detect display modulation consisting of flickering or banding and to remove image artifacts by dividing a pixel density of the image data into respective bit planes, the image enhancement application being configured to render an image in response to the image enhancement and the edge enhancement modification.

2. The image enhancement system of claim 1, wherein the image enhancement application includes an image signal process configured to receive the display data from the display.

3. The image enhancement system of claim 2, wherein the image signal process is configured to render the image data based on the display data received from the display into the image.

4. The image enhancement system of claim 1, wherein the image enhancement includes at least one of tone mapping restoration, contrast restoration, luma restoration, and chroma adjustment.

5. The image enhancement system of claim 4, wherein the display data includes at least one of a backlight ratio, a contrast ratio, and a display density, and the data processing hardware is configured to execute the image enhancement based on at least one of the operational state, the backlight ratio, the contrast ratio, and the display density.

6. The image enhancement system of claim 5, wherein the image enhancement application is configured to compare the pixel density from the image data and the display density of the display data.

7. The image enhancement system of claim 1, wherein the edge enhancement modification includes image composition, the data processing hardware configured to execute the image composition in response to the image enhancement.

8. An image enhancement system comprising:

a display including display data;

an imager operably coupled to and disposed behind the display, the imager being configured to capture image data; and an electronic control unit (ECU) communicatively coupled to the imager and the display and including data processing hardware configured to execute an image enhancement application, the image enhancement application configured to receive the image data from the imager and the display data from the display and to execute an image enhancement and edge enhancement modification of the image data based on the display data including executing bit-plane splicing configured to detect display modulation consisting of flickering or banding and to remove image artifacts by dividing a pixel density of the image data into respective bit planes.

9. The image enhancement system of claim 8, wherein the image enhancement application includes an image signal process configured to receive the display data from the display.

10. The image enhancement system of claim 9, wherein the image signal process is configured to render the image data based on the display data received from the display.

11. The image enhancement system of claim 8, wherein the image enhancement includes at least one of tone mapping restoration, contrast restoration, luma restoration, and chroma adjustment.

12. The image enhancement system of claim 11, wherein the display data includes at least one of an operational state, a backlight ratio, a contrast ratio, and a display density, and the data processing hardware is configured to execute the image enhancement based on at least one of the operational state, the backlight ratio, the contrast ratio, and the display density.

13. The image enhancement system of claim 12, wherein the image enhancement application is configured to compare the pixel density from the image data and the display density of the display data.

14. The image enhancement system of claim 8, wherein the edge enhancement modification includes image composition, the data processing hardware configured to execute the image composition in response to the image enhancement.

15. A computer-implemented method when executed by data processing hardware causes the data processing hardware to perform operations comprising:

acquiring display data from a display including an operational state;

monitoring, via a lookup table value, a display data of the display;

acquiring image data from an imager;

rendering, via an image enhancement application, the acquired image data in response to the operational state of the display;

executing, via the image enhancement application, image enhancement of the rendered image data based on the display data;

executing, via the image enhancement application, an edge enhancement modification of the image data;

executing bit-plane splicing configured to detect display modulation consisting of flickering or banding and to remove image artifacts by dividing a pixel density of the image data into respective bit planes; and composing the enhanced image data.

16. The method of claim 15, wherein executing the image enhancement includes one or more of performing tone mapping restoration of the image data, performing contrast restoration of the image data, performing luma restoration of the image data, and performing chroma adjustment of the image data.

17. The method of claim 15, further including constructing the imager behind the display.

18. The method of claim 15, wherein acquiring the display data includes acquiring a backlight ratio, a contrast ratio, and a display density.

19. The method of claim 15, wherein executing the image enhancement and executing the edge enhancement modification includes referencing the display data.

20. The method of claim 15, further including:

bypassing the image enhancement when the operational state of the display is an inactive state; and composing the image data via an image signal directly.

* * * * *